Oct. 15, 1935.  C. C. FARMER  2,017,791
ELECTROPNEUMATIC BRAKE
Filed Jan. 10, 1931   2 Sheets-Sheet 1
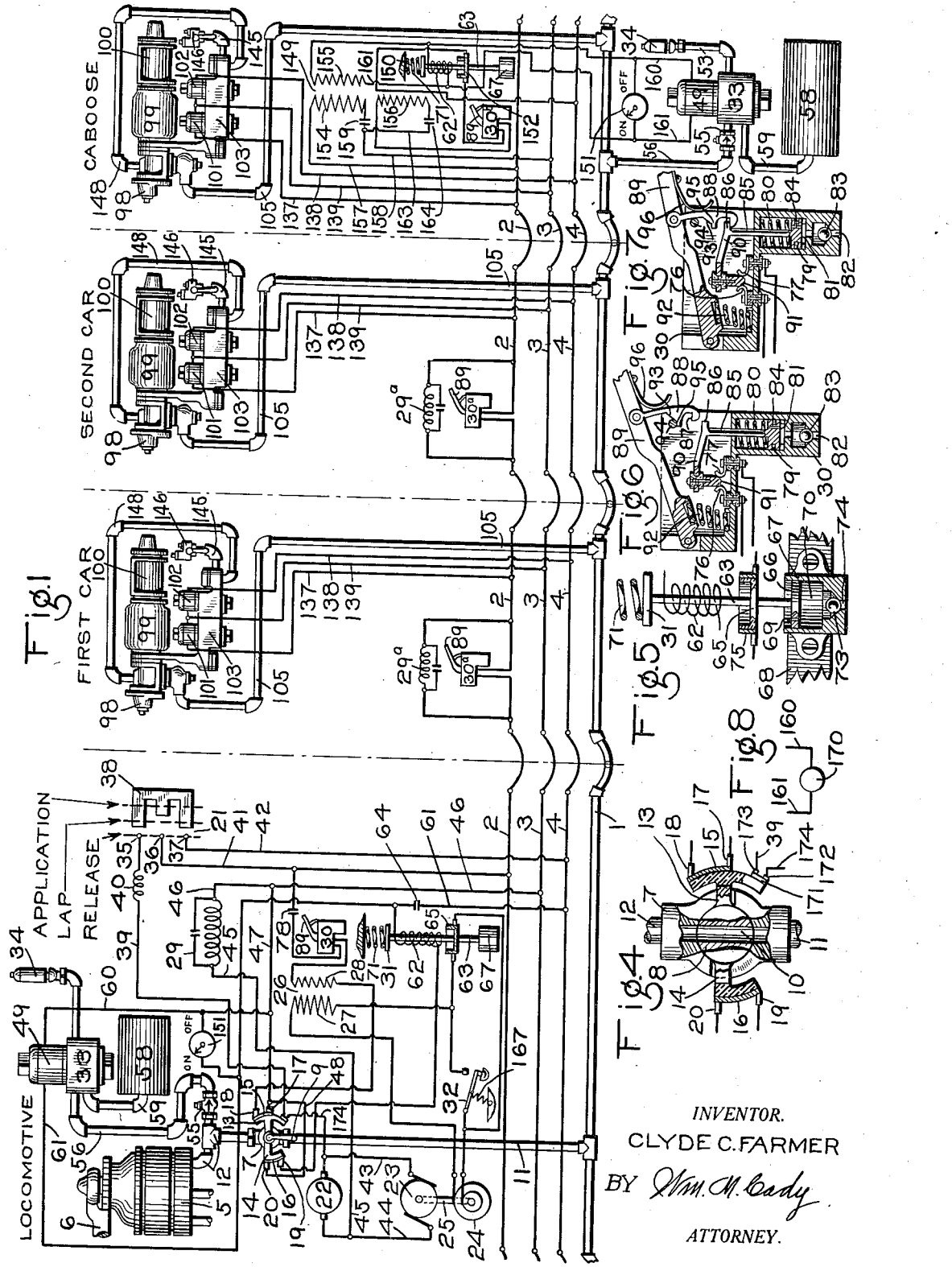
INVENTOR.
CLYDE C. FARMER
BY Wm. M. Cady
ATTORNEY.

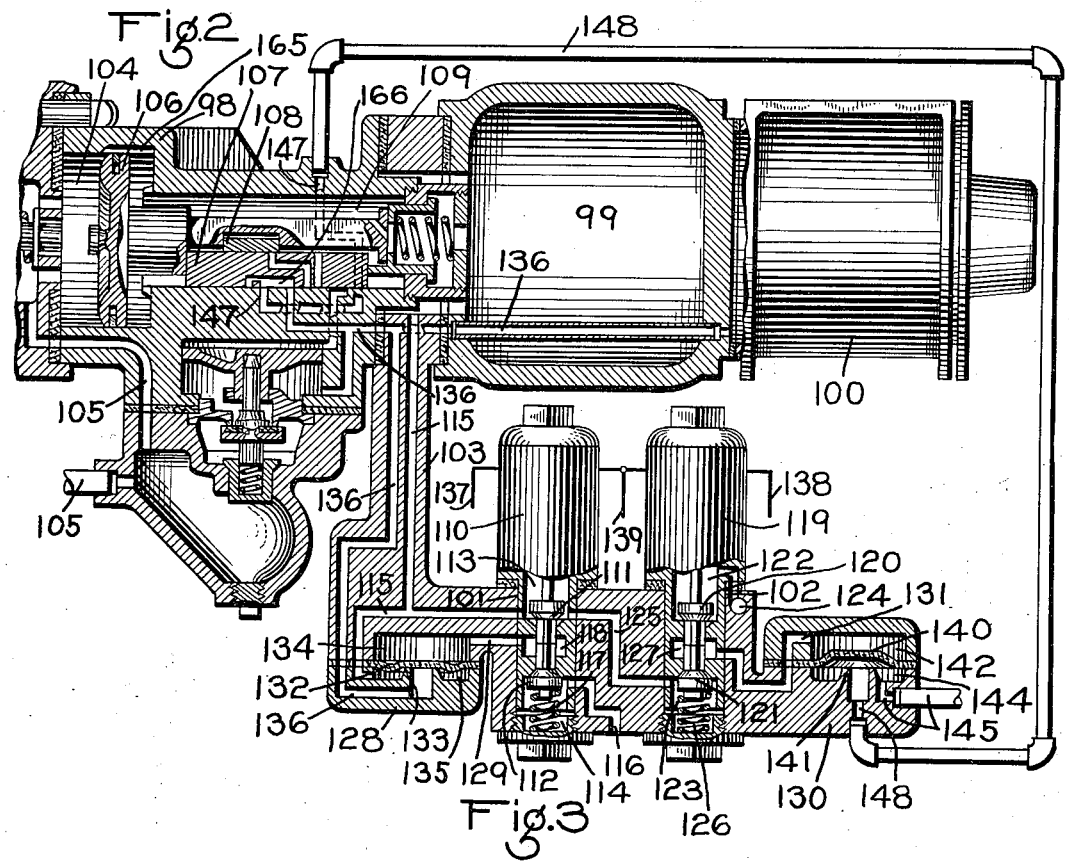

Patented Oct. 15, 1935

2,017,791

UNITED STATES PATENT OFFICE 2,017,791

ELECTRO-PNEUMATIC BRAKE

Clyde C. Farmer, Pittsburgh, Pa., assignor to The Westinghouse Air Brake Company, Wilmerding, Pa., a corporation of Pennsylvania Application January 10, 1931, Serial No. 507,783

39 Claims. (Cl. 303—20)

This invention relates to brake equipment and more particularly to electro-pneumatic brake equipment for the handling of freight trains, although adapted for other classes of service.

In electro-pneumatic brake systems, it has heretofore been considered necessary, as a safety measure, to employ the principle of automatically effecting an application of the brakes to bring the train to a stop in the event of the breakage of a current conducting wire or the failure of the current supply source. While this is a very desirable feature from a safety standpoint, it has the disadvantage of taking the control of the brakes away from the operator in bringing the train to a stop, which, under certain track and service conditions may result in serious consequences. A further disadvantage of taking the control of the brakes away from the operator is, that the train cannot proceed until the trouble is discovered and remedied and this not only delays the train but also tends to block traffic.

With the above mentioned safety feature in view, it has heretofore been considered necessary to employ the closed circuit principle for operating an electrically controlled train brake system, particularly because with a closed circuit system, in the event of the failure of the current supply source to supply current or the breakage of a train wire, the brakes will be automatically applied, whereas with an open circuit system, if a train wire should break or the current source should fail, the operator would not be made aware of the fault until he tried to make an application of the brakes and then the failure to obtain an application of the brakes would probably result in serious consequences.

Further, a closed circuit system has the disadvantage that a large current consumption is necessary to maintain the brake magnets, throughout the train, properly energized while the brakes are released since each brake magnet in operating dependably consumes approximately one watt, and that the train wires, especially at the head end of the train, must carry a high voltage to provide for the natural drop in voltage toward the rear end of the train due to the consumption of current by the brake magnets and to maintain the voltage at the rear end of the train sufficiently high to insure the proper energization of the magnets on this portion of the train. It will be seen that due to this gradual drop in voltage toward the rear end of the train, the voltage at the head end of a long train of from 150 to 200 cars, must necessarily be high, say for instance, from 120 to 150 volts, to insure the dependable energization of all of the magnets on the train.

In order to overcome the disadvantage of the open circuit system that no brake application would be obtained in the event of the breakage of a train wire or of the failure of the current source to supply current to the system, it has heretofore been proposed to combine a fluid pressure brake system with the electrically controlled system in such a manner that the fluid pressure system will automatically become effective in the event of the failure of the electric system, but such a combination involves the use of a complicated and expensive interlocking apparatus.

The principal object of my invention is to provide an open circuit electrically controlled brake system having means whereby the system is made safe and reliable and in which the operator will always know the condition of the electric system and will therefore be prepared to stop the train when necessary, even though a conducting wire be broken or there is a failure of the source of current.

This object I attain by combining two electric circuit systems, one of which is normally open and is for the purpose of controlling the brakes and the other is normally closed and is for the purpose of indicating to the operator, whether or not the normally open brake system is in proper condition to control the brakes. This normally closed system is also adapted to indicate to the trainmen in the caboose of the train the condition of the brake controlling circuit system.

In double heading service it is desirable that the train brake system be controlled from the head locomotive and that the control on the second locomotive be rendered ineffective. In the usual locomotive fluid pressure brake equipment this is accomplished by operating the usual double heading cock on the second locomotive to close off communication between the brake pipe and the brake valve device. Another object of my invention is to provide an electro-pneumatic brake equipment embodying a combined double heading cock and switch device operative to render the pneumatic and electrical control means on the locomotive either effective or ineffective to control the train brakes.

A further object of my invention is to provide an electro-pneumatic brake equipment having improved valve mechanism for controlling the application and release of the brakes.

Other objects and advantages will appear in the following more detailed description of the invention.

In the accompanying drawings; Fig. 1 is a diagrammatic view of an electro-pneumatic brake system embodying my invention, the equipment for a locomotive, two cars and a caboose being shown; Fig. 2 is a diagrammatic view, mainly in section, of the fluid pressure brake equipment and a portion of the electrical equipment for each car and the caboose; Fig. 3 is a diagrammatic view, partly in section, of a fluid pressure operated warning device, one of which is carried by the locomotive and another of which is carried by the caboose; Fig. 4 is an enlarged detail elevational view, partly in section, of a combined double heading cock and switch for the locomotive equipment; Fig. 5 is an enlarged sectional view of a slow acting relay switch device; Fig. 6 is an enlarged detail sectional view of a signal switch device in its normal circuit closing position; Fig. 7 is a similar view of the signal switch device in a position in which it is about to initiate a signal; and Fig. 8 is a diagrammatic view of a modification of the warning arrangement in which an incandescent lamp is employed for visibly indicating.

As shown in Fig. 1 of the drawings, my electro-pneumatic brake equipment may comprise the usual train brake pipe 1 and train wires 2, 3 and 4, which wires will hereinafter be respectively termed, application wire, return wire and release wire.

The locomotive equipment may comprise the usual brake valve device 5 which is adapted to be manipulated through the medium of a handle 6 to control the train brakes pneumatically, and may also comprise a combined double heading cock and switch device 7 having a valve 8 mounted therein which is adapted to be rotated by a handle 9. This valve 8 has a passage 10 normally establishing communication between a pipe 11 leading from the brake pipe 1 and a pipe 12 leading from the brake valve device 5 and is provided with switch arms 13 and 14. The arm 13 carrying spaced contact plates 15 and 171 and the arm 14 carrying a contact plate 16, there being suitable insulating material interposed between said arms and their respective contact plates. With the device 7 in its normal position as shown in Figs. 1 and 4, the contact plate 15 connects contact terminals 17 and 18, the plate 16 connects contact terminals 19 and 20 and the contact plate 171 connects contact terminals 172 and 173.

The locomotive equipment may further comprise a brake switch device 21 which is operative manually to electrically control the brakes, a turbo-generator 22 for generating direct current, a direct current motor 23, an alternating current generator 24 which is driven through the medium of the motor shaft 25, a transformer 26 having primary and secondary windings 27 and 28 respectively, a tuned impedance coil 29, a signal switch device 30, a slow acting relay switch device 31, a reset switch device 32, a magnet valve device 33 and a sounding device 34.

The brake switch device 21 may comprise terminal contacts 35, 36 and 37 and a movable contact member 38 which is adapted to be moved into and out of contact with said terminal contacts as will hereinafter more fully appear. The switch contact 35 and one terminal of the direct current generator are connected by a wire 39, contact terminal 173, contact plate 171 of the double heading cock and switch device, contact terminal 172 and a wire 174. Interposed in wire 39 and within the switch, is the well known magnetic arc blow-out coil 40 to break any arc which may be formed between the contact plate and the switch contacts when the switch is manipulated to control the brakes. The switch contacts 36 and 37 are respectively connected to the application wire 2 and the release wire 4 by wires 41 and 42.

The direct current motor 23 may be of the usual construction and is connected in circuit with the direct current generator through the wire 39 and wires 43 and 44. Connecting the wire 44 and one terminal of the impedance coil 29 is a wire 45, the other terminal of the coil being connected to the return wire 3 by a wire 46, which wire 46 is connected to the terminal contact 17 of the combined double heading cock and switch device 7 by a wire 47 and this wire 47 is connected to the terminal contact 20 by a wire 48.

The magnet valve device 33 comprises a magnet 49 adapted to control oppositely seating valves 50 and 51, the valve 50 being contained in a chamber 52 which is open to the whistle 34 through a passage and pipe 53 and the valve 51 being contained in a chamber 54 to which the pipe 12 is connected through a check valve device 55 and a pipe and passage 56. Also contained in the chamber 54 is a coil spring 56, the pressure of which tends to seat the valve 51 and unseat the valve 50. Intermediate the valves 50 and 51 there is a chamber 57 which is connected to a fluid pressure supply reservoir 58 through a passage and pipe 59. One terminal of the magnet 49 is connected to the wire 47 by a wire 60 and the other terminal is connected to the release wire 4 by a wire 61.

The slow acting relay switch device 31 comprises an operating coil 62 adapted to operate a plunger stem 63, one end of the coil being connected to the wire 61 and the other end being connected to the terminal contact 19 of the combined double heading cock and switch device 7. Interposed in the wire 61 and intermediate the release wire 4 and the connections of the coil 62 and the magnet 49 with the wire 61 is a condenser 64 which, as will hereinafter appear, is for the purpose of preventing the flow of direct current to this coil and magnet. Carried by the plunger stem 63 is a switch member 65, which when the coil 62 is energized closes a circuit through the alternating current generator 24 and the primary winding 27 of the transformer 26 and when deenergized is adapted to open said circuit. Secured to the lower end of the plunger stem 63 is a plunger 66 which is movable up and down in a dashpot 67 secured to any desired rigid part 68 of the locomotive, said plunger having a small relief port 69 which provides for the slow escape of fluid from the chamber 70 at one side of the plunger when the coil 62 is deenergized and the pressure of a spring 71 which is interposed between the upper end of the plunger stem 63 and a rigid part 72 of the locomotive, causes the stem, switch member 65 and plunger 66 to move downwardly. In the bottom of the dashpot 67 there is mounted a ball check valve 73 which prevents the flow of fluid from the chamber 70 to the atmosphere through a fluid inlet passage 74. The contact ring 75 carried by the switch member 65 is made wide enough so that the circuit through the primary winding 27 of the transformer 26 and generator 24 is not opened as soon as the stem starts to move downwardly, but maintains the circuit closed until the stem has been moved a distance corresponding to the width of the contact ring. Due to this, as well as to the resistance the fluid in the chamber 70 offers to the pressure of the spring 71, the several movable parts of the switch move downwardly at a slow speed so that the generator circuit is not opened until after a predetermined period of time has elapsed. The reason for the slow action of this switch device, as will hereinafter appear, is to prevent the unintentional opening of the generator circuit when signalling.

The signal switch device 30 may comprise a casing in which switch fingers 76 and 77 are rigidly mounted in spaced relation to each other, the contact 76 being connected to one terminal of the secondary winding 28 of the transformer 26 and the contact 77 being connected to the wire 41, there being a condenser 78 interposed in the connection from the contact 77 to the wire 41 to prevent the flow of direct current through said secondary winding. The other end of the secondary winding 28 is connected to the terminal contact 18 of the combined double heading cock and switch device 7. Mounted in the switch casing is a plunger 79 which is subject on one side to the pressure of a spring 80. At the other side of the plunger is a chamber 81 into which fluid from the atmosphere flows through a passage 82 past a ball check valve 83. The plunger is provided with a relief port 84 through which fluid escapes from the chamber 81 when the plunger is moved downwardly, the check valve 83 preventing back flow of fluid from the chamber 81 to the atmosphere by way of passage 82. The plunger 79 has a stem 85 which at its outer end is provided with a horizontally disposed lug 86 which is adapted to be engaged by the tooth 87 of a latch member 88 pivotally connected to a handle 89 which in turn is pivotally connected to the casing. The stem 85 is also provided with a horizontally disposed lug 90, and secured to this lug and depending downwardly therefrom, is a switch member 91 which normally connects the switch contact fingers 76 and 77.

Contained in the switch casing and interposed between and engaging the casing and the switch handle 89 is a spring 92, the pressure of which yieldably maintains the handle in its upper position as shown in Fig. 6. With the handle in this position, the latch member is held in its unlatching position by a sloping surface 93 on one side of the latch engaging a projection 94 rigidly carried by the casing, excessive upward movement of the handle being prevented by a stop 95 on the latch member engaging the projection 94. Mounted on the handle is a spring 96 which engages the other side of the latch member and tends to force the latch member toward its latching position.

Assuming the several parts of the signal switch device to be in their normal circuit closing positions as shown in Fig. 6 and it is desired to open the circuit for signalling, the operator presses the handle 89 downwardly, compressing the spring 92 and causing the latch member to move downwardly. As the latch member is thus moved, the sloping surface 93, which recedes in a direction toward the pivoted end of the member, slides on the projection 94 and permits the pressure of the spring 96 to rotate the member slightly in a clockwise direction into latching engagement with the lug 86 on the plunger stem 85 as shown in Fig. 7.

Now when the operator relieves the handle 89 of downward pressure, the pressure of the spring 92 causes the handle to move toward its normal position as shown in Fig. 6. As the handle is thus moved, the latch member, by reason of its engagement with the plunger stem 85, causes the plunger 79 to move upwardly against the opposing pressure of the spring 80. When the plunger and stem have thus been moved a sufficient distance that the switch member 91 is out of contact with the contact fingers 76 and 77 the latch member, by reason of the engagement of the sloping surface 93 thereof with the lug 94, is caused to move out of engagement with the lug 86 on the plunger stem. With the plunger stem thus released, the pressure of the spring 80 acting on the plunger 79 causes the plunger and stem to move downwardly against the opposing pressure of fluid in the chamber 81, which is permitted to escape slowly to the atmosphere through the small relief port 81 in the plunger, until the plunger comes to rest against a stop 97 in the casing, at which time the switch member will again be in contact with contact fingers 76 and 77, and consequently, the circuit will be closed.

It will be noted that when the switch device has been operated to open the circuit, the circuit will be maintained open for a predetermined period of time. It is to be understood that the period of time elapsing between the opening and closing of the circuit by means of the signal switch device is less than that required for the operation of the relay switch device 31 to its circuit opening position, so that when signalling the relay switch device cannot operate to open the brake controlling circuit, as will hereinafter appear.

Each of the car equipments may comprise a triple valve device 98, an auxiliary reservoir 99, a brake cylinder 100, an application magnet valve device 101 and a release magnet valve device 102, both of said magnet valve devices being carried by a pipe bracket 103 which is clamped between the triple valve device and auxiliary reservoir.

The triple valve device 98 may be of the usual type comprising a casing having a chamber 104 connected to the brake pipe 1 through a passage and pipe 105 and containing a piston 106 adapted to operate a main slide valve 107 and a graduating slide valve 108 contained in a chamber 109 connected to the auxiliary reservoir 99.

The application magnet valve device 101 may comprise a magnet 110 adapted to control oppositely seating valves 111 and 112 contained in chambers 113 and 114 respectively, the chamber 113 being connected to the auxiliary reservoir 99 through a passage 115 and the chamber 114 being open to the atmosphere through a passage 116. Also contained in the chamber 114 is a spring 117, the pressure of which tends to seat the valve 112 and unseat the valve 111. Intermediate the valves 111 and 112 there is a chamber 118 which leads to an application valve device 128 through a passage 129.

The magnet valve device 102 may comprise a magnet 119 adapted to control oppositely seating valves 120 and 121 contained in chambers 122 and 123 respectively, the chamber 122 being open to the atmosphere through a passage 124 and the chamber 123 being connected to the valve chamber 113 of the magnet valve device 101 through a passage 125. Also contained in the chamber 123 is a spring 126, the pressure of which tends to seat the valve 121 and to unseat the valve 120. Intermediate the valves 120 and 121 there is a chamber 127 which leads to a release valve device 130 through a passage 131.

One terminal of the magnet 110 is connected to the application wire 2 by a wire 137 and one terminal of the magnet 119 is connected to the release wire 4 by a wire 138, while each of the other terminals of the magnets are connected to the return wire 3 by a wire 139.

The application valve device 128 may comprise a flexible diaphragm valve 132 which is mounted in the bracket 103 and is adapted to seat on an annular seat rib 133. A chamber 134 at one side of the diaphragm valve is connected to the chamber 118 of the magnet valve device 101 through the passage 129 and a chamber 135 at the other side being open to the passage 115. Leading from the inner seated area of the diaphragm valve is a brake cylinder passage 136.

The release valve device 130 may comprise a flexible diaphragm valve 140 which is mounted in the bracket 103 and is adapted to seat on an annular seat rib 141. A chamber 142 at one side of the diaphragm valve is connected to the chamber 127 of the magnet valve device 102 through the passage 131 and a chamber 144 at the other side is open to the atmosphere through a pipe and passage 145 and the usual brake cylinder pressure retaining valve device 146. Leading from an exhaust passage 147 in the triple valve device 98 to the inner seated area of the diaphragm valve 140 is an exhaust pipe and passage 148.

Each car equipment may also comprise a signal switch device 30ª which may be of substantially the same construction as the signal switch device 30 described in connection with the locomotive equipment and may further comprise a tuned impedance coil 29ª having one of its terminals connected to the application wire 2 at one side of the switch device 30ª and its other terminal connected to the wire 2 at the other side of the switch device.

The impedance device 29 used in the locomotive equipment is for the purpose of preventing the flow of alternating current to the direct current generator 22 and motor 23, and each of the impedance devices 29ª used in the car equipments is for the purpose of permitting the flow of direct current around an adjacent signal switch device when the switch device is in circuit open position in signalling and to prevent the flow of alternating current past the switch device while the switch device is in circuit open position.

The caboose equipment may comprise a triple valve device 98, an auxiliary reservoir 99, a brake cylinder 100, magnet valve devices 101 and 102, an application valve device 128, a release valve device 130 and a retaining valve device, each of which may be identical with the corresponding device described in connection with the car equipment.

The caboose equipment may also comprise a transformer 149, a slow acting relay switch device 150, a signal switch device 30ᵇ, a magnet valve device 33, a warning whistle 34 and a signal device 151 for visibly indicating a signal.

The signal switch device 30ᵇ on the caboose is substantially the same in construction as the corresponding device 30 described in connection with the locomotive equipment.

The slow acting relay switch device 150 is of substantially the same construction as that of the relay switch device 31 of the locomotive equipment, the switch member, which is carried by the plunger stem, being indicated by the reference character 152.

The audible warning mechanism included in the caboose equipment and which comprises a magnet valve device, a whistle, a fluid pressure supply reservoir and a check valve device, is substantially the same as the mechanism described in connection with the locomotive equipment.

The transformer 149 comprises a primary winding 154, a secondary winding 155 and another secondary winding 156. One end of the primary winding 154 is connected to the application wire 2 by a wire 157 and the other end is connected to the return wire 3 by a wire 158, there being a condenser 159 interposed in the wire 158. One end of the secondary winding 155 is connected to one terminal of the magnet 49 of the caboose magnet valve device 33 by a wire 160 and the other end is connected to the other terminal of the magnet 49 by a wire 161. The operating coil 62 of the relay switch device 150 is connected across the wires 160 and 161. One end of the secondary winding 156 is connected to the wire 158 at a point intermediate the condenser 159 and the return wire 3 by a wire 163 in which there is interposed a condenser 164.

Connected across the wires 60 and 61 of the locomotive, is a signal device 151 for visibly indicating a signal to the engineer, said device being identical with the signal device 151 on the caboose. Each of these devices is so constructed that it will indicate when the circuit, in which it is interposed, is energized or deenergized.

In operation, assuming the locomotive, car and caboose equipments to be operatively connected as shown in Fig. 1 of the drawings, and the combined double heading cock and switch device to be in its normal position, that is, in position for single locomotive operation, the operator, by the use of the brake valve device 5, causes fluid under pressure to be supplied to the brake pipe 1 in the usual manner. Fluid under pressure thus supplied to the brake pipe flows therefrom to the piston chamber 104 of the triple valve device 98 of each car and caboose equipment through pipe and passage 105, and with the triple valve parts in release position, as shown in Fig. 2, fluid under pressure flows from the piston chamber 104 to the auxiliary reservoir 99 through the usual feed groove 165 around the triple valve piston 106 and valve chamber 109.

Fluid under pressure supplied to the valve chamber 109 in the triple valve device and the auxiliary reservoir 99 flows to the diaphragm chamber 134 in the application valve device through passage 115, valve chamber 113 in the magnet valve device 101, past the unseated valve 111, through chamber 118 and passage 129. From the chamber 113 fluid under pressure flows to the valve chamber 123 in the magnet valve device 102 through a passage 125. Fluid under pressure also flows from the passage 115 to the chamber 135. With the triple valve device in release position, the passage 136 which leads from the inner seated area of the flexible diaphragm valve 132 and from the brake cylinder 100 is connected to the atmosphere through a cavity 166 in the main slide valve 107 of the triple valve device, passage 147, pipe 148, chamber 144, passage and pipe 145 and the retainer valve device 146. Since the inner seated area of the diaphragm is connected to the atmosphere, as just described, the pressure of fluid in the chamber 134 will maintain the diaphragm valve 132 seated on the seat ring 133 against the opposing pressure of fluid in the chamber 135 so that there will be no loss of fluid past this valve from the auxiliary reservoir to the atmosphere.

It will here be noted that with the valve 120 of the magnet valve device unseated, the valve chamber 142 in the release valve device 130 is connected to the atmosphere through passage 131, chamber 127 in the magnet valve device 102, past the unseated valve 129, through valve chamber 122 and passage 124, so that the diaphragm release valve 140 will not obstruct communication from the pipe and passage 148 to the atmosphere.

If the turbo-generator 22 has been idle during the initial charging of the equipment, the relay switch device 31 on the locomotive will be in its circuit open position and the relay switch device 150 of the caboose equipment will also be in its circuit open position.

When the operator causes the turbo-generator 22 to operate, the direct current generated by this generator causes the motor 23 to operate the generator 24 to generate alternating current, but since the relay switch device 31 is in its circuit open position, this alternating current cannot be impressed on the primary winding 27 of the transformer 26 of the locomotive equipment. In order to complete the circuit through this winding and the generator, the operator moves the reset switch 32 from the position shown in Fig. 1 to the position in which one terminal of the alternating current generator 24 is connected to one end of the winding. Now, since the other end of this winding is connected to the other side of the generator, a circuit through the winding is closed and alternating current is impressed on the winding.

With the electrical equipments of the locomotive, each car and the caboose operatively coupled together as shown in Fig. 1, it will be noted that the secondary winding 28 of the locomotive transformer is connected in series with the primary winding 154 of the caboose transformer 149 through the locomotive signal switch device 30 which is connected to one end of the secondary winding 28, condenser 78, wires 41 and 2, car signal switch devices 30ª which are interposed in the wire 2, wire 157, primary winding 154 of the caboose transformer, wire 158 and the condenser 159 interposed therein, wires 3, 46 and 47, contact terminal 17 of the combined double heading cock and switch device 7, contact plate 15 and contact terminal 18 of this device 7 and secondary winding 28 of the locomotive transformer.

When alternating current is impressed on the primary winding, an alternating current is induced in the circuit just traced, so that the primary winding 154 of the caboose transformer 149 will cause alternating current to be induced in the secondary windings 155 and 156. Now, since the operating coil 62 of the relay switch device 159 on the caboose is connected across the wires 160 and 161 leading from the opposite ends of the secondary winding 155, the coil 62 is energized, so that the stem 63 is caused to move upwardly, against the opposing pressure of the spring 71, to such a position that the switch member 152 carried thereby closes the circuit through the secondary winding 156 and the magnet 49 of the locomotive magnet valve device 33. With this circuit through the secondary winding 156 thus closed by the relay switch device 159, and with the circuit through the secondary winding 155 constantly closed, alternating current is impressed on both magnets 49 and they are thus energized. Each magnet 49 when energized causes the valve 50 thereof to be seated and the valve 51 to be unseated against the opposing pressure of the spring 54. With the valve 51 unseated, fluid under pressure supplied to the brake pipe flows to the reservoir 58 through check valve device 55, pipe and passage 56, valve chamber 54, past the unseated valve 51, chamber 57 and passage and pipe 59, thus charging the reservoirs 58, the check valve devices 55 preventing back flow of fluid from the reservoirs to the brake pipe.

When the two warning or magnet circuits are energized, the warning devices 151, which are connected across the circuit wires of the magnets 49, are energized and an indicating hand is caused to move to "on" position, indicating that the circuits are energized, one of these devices indicating on the locomotive and the other indicating on the caboose.

Since the operating coil 62 of the locomotive relay switch device 31 is connected across the circuit wires 61 and 47, the coil 62 will be energized by the alternating current induced in the secondary winding 156 of the caboose transformer 149, causing the stem 63 to move upwardly to such a position that the switch member 65 closes the circuit through the generator and primary winding 27 of the locomotive transformer 26. The operator may now release the reset switch 32 and when released it will be returned to its open position as shown in Fig. 1 by the pressure of a spring 167.

It will here be noted that the tuned impedance coil 29 on the locomotive closes off alternating current in the circuit wire 46 from the wire 45 and consequently from the direct current generator 22 and motor 23.

The magnets 101 of the cars and the caboose are each connected across the application wire 2 and the return wire 3 and the magnets 102 are each connected across the release wire 4 and the return wire 3, but since the inductance of these direct current magnets is extremely high, there will be no appreciable leakage of alternating current therethrough from the train wires 2, 3 and 4, and consequently the magnets cannot be effectively energized by the alternating current.

Now when it is desired to effect an application of the brakes through the medium of the electrical equipment, the operator moves the brake switch device 21 to application position, in which the switch member 38 contacts with contact terminals 35, 36 and 37, thus connecting one terminal of the direct current generator 22 to both the application wire 2 and the release wire 4. With these connections thus made, current from the generator flows through wire 174, contact plate 171 of the double heading cock and switch device, wire 39, brake switch device 21, wire 42, release wire 4, wire 138 on each car and the caboose and magnet 119 of each magnet valve device 102 and returns to the other side of the generator through wire 139 on each car and the caboose, return wire 3, wire 46, impedance coil 29 on the locomotive and wire 45. Direct current flowing through the brake switch device also flows through wire 41, application wire 2, wire 137 on each car and the caboose and magnet 118 of each magnet valve device 101 and returns to the generator through the wire 139 and return wire 3 as described in connection with the circuit of the magnet 119.

It will here be noted that the condenser 78 on the locomotive will prevent the flow of direct current through the secondary winding 28 of the locomotive transformer 26 and the condenser 64 will prevent the flow of direct current through the operating coil 62 of the relay switch device 75

31 on the locomotive and through the magnet 49 of the locomotive magnet valve device 33. On the caboose the condensers 159 and 164 prevent the flow of direct current through the primary winding 154 and secondary winding 156 of the transformer 149.

Direct current flowing through the magnet 119 of the magnet valve device 102 causes the magnet to be energized and when so energized causes the valve 120 to be seated and the valve 121 to be unseated. With the valve 121 unseated, fluid under pressure from the valve chamber 123, as supplied from the auxiliary reservoir, flows to the chamber 142 in the release valve device past the unseated valve 121, through chamber 127 and passage 131, causing the diaphragm valve 140 to flex downwardly into seating engagement with the annular seat rib 141, thus closing communication from the brake cylinder 100 to the atmosphere.

Direct current flowing through the magnet 110 of the magnet valve device 101 causes the magnet to be energized and when so energized, causes the valve 111 to be seated and the valve 112 to be unseated. The seating of the valve 111 closes communication from the auxiliary reservoir to the chamber 134 in the application valve device 128. With the valve 112 unseated, fluid under pressure is vented from the chamber 134 to the atmosphere through passage 129, chamber 118, past the unseated valve 112, through valve chamber 114 and passage 116. With the chamber 134 thus vented, the pressure of fluid in the chamber 135 as supplied from the auxiliary reservoir and acting on the under side of the diaphragm valve 136 causes said valve to flex upwardly from the seat rib 133, so that fluid under pressure now flows from the auxiliary reservoir 99 to the brake cylinder 100 through passage 115, valve chamber 135 and passage 136. Now, since the release valve 140 is seated so that fluid under pressure supplied to the brake cylinder passage 136 cannot escape to the atmosphere, an application of the brakes is effected.

If it should be desired to limit the brake cylinder pressure in effecting an application of the brakes, the operator first moves the brake switch device 21 to application position, which causes the car and caboose equipments to operate to supply fluid under pressure to the brake cylinders in the same manner as just described and then when the desired brake cylinder pressure is obtained, manipulates the brake switch device to lap position, opening the circuit through the magnet 110 of each of the magnet valve devices 101 and maintaining the circuit through the magnet 119 of each of the magnet valve devices 102 closed.

Upon the opening of the circuit through the magnet 110 said magnet is deenergized and the pressure of the spring 117 causes the valve 112 to be seated and the valve 111 to be unseated. With the valve 112 seated, communication from the chamber 134 in the application valve device 128 to the atmosphere is closed off and with the valve 111 unseated, fluid under pressure from the passage 115 again flows to the chamber 134 and causes the diaphragm valve 132 to flex downwardly into seating engagement with the seat ring 133, thus closing off the further flow of fluid from the auxiliary reservoir to the brake cylinder.

To effect the electric release of the brakes, the operator moves the brake switch device 21 to release position, opening both magnet circuits, which results in the deenergization of all of the magnets 110 and 119. With the magnet 110 of each car unit deenergized the application valve 132 is caused to seat and close off the flow of fluid from the auxiliary reservoir to the brake cylinder passage 136 as before described. With the magnet 119 deenergized, the pressure of the spring 126 of the magnet valve device 102 causes the valve 121 to be seated, closing communication from the valve chamber 123 and thereby the auxiliary reservoir, to the chamber 142 in the release valve device 130, and causes the valve 120 to be unseated. With the valve 120 unseated, fluid under pressure in the chamber 142 exhausts to the atmosphere through passage 131, chamber 127 in the magnet valve device 102, past the unseated valve 120, through valve chamber 122 and passage 124.

With the pressure in chamber 142 thus removed from the upper side of the diaphragm valve 140 said valve will be flexed upwardly by the pressure of fluid in the passage 148 and acting on the inner seated area of the release valve 140. With the valve 140 thus unseated, fluid under pressure flows from the brake cylinder to the atmosphere through passage 136, cavity 166 in the main slide valve 197 of the triple valve device 98, passages and pipe 148, valve chamber 144 in the release valve device 130, passage and pipe 145 and retainer valve device 146, thus the release of the brakes is effected. With the brakes completely released, the diaphragm valve 140 may, due to its inherent resiliency, remain in its unseated position until such time as an application of the brakes is initiated by means of the electric equipment.

It will here be understood that the application and release of the brakes is to be normally controlled through the medium of the electric equipment and that the triple valve device, when the electric equipment is used, does not move from its release position. However, in the event of a failure of the electric equipment, the operator by the use of the brake valve device 5 may so vary the brake pipe pressure as to cause the triple valve devices 98 to operate to effect the application and release of the brakes in the usual well known manner.

From the foregoing description it will be seen that I employ the open circuit principle to normally control the brakes of a train electrically and that I also employ a normally closed circuit in combination therewith for indicating, at all times, the condition of the electric system. As before described, when the electric system is in its proper brake controlling condition, the device 151 on the locomotive will visibly indicate this condition to the operator and the device 151 on the caboose will also indicate this condition to the trainmen.

If the current source on the locomotive should fail, the complete electric system would be deenergized and the hands of the warning devices 151 on the locomotive and caboose would move from their normal "on" position to "off" position, thus indicating to the operator that the electric system is not in its proper condition to control the brakes and that he must move the brake valve device 5 to control the brakes. The indication in the caboose warns the trainmen of a faulty system so that they may be ready to search for the trouble when the first stop is made.

Further, in the event of the failure of the current source, the magnet 49 of each of the magnet valve devices 33 will be deenergized so that the pressure of the spring 56 will cause the valve 51 to be seated and the valve 50 to be unseated. With the valve 51 seated, communication from the brake pipe to the reservoir 58 is closed and with the valve 50 unseated, fluid under pressure from the charged reservoir 58 flows to the atmosphere through pipe and passage 59, chamber 57, past the unseated valve 50, through valve chamber 52, passage and pipe 53 and the whistle 34, fluid flowing through the whistle, causing the whistle to sound a warning.

It will thus be seen that on the locomotive and the caboose the warning will be both visible and audible.

If the wire 2 should break, the circuit through the primary winding 154 of the caboose transformer 149 will be open, so that there will be no current induced in the secondary windings 155 and 156 and consequently the warning devices on the caboose which are connected in circuits with the secondary winding 155 will indicate, as above described, on the caboose, a fault in the electric system, and the warning devices on the locomotive, which are connected in circuit with the secondary winding 156, will indicate on the locomotive a fault in the system.

The primary winding 154 and the secondary winding 156 of the caboose transformer have the same number of turns and are connected together in series. However, the secondary winding 156 is wound in the opposite direction to which the primary winding is wound. With this in view, it will be seen that if the return wire 3 should break the secondary winding 156 becomes, in effect, a primary winding, but since the windings 154 and 156 are wound in opposite directions and each have the same number of turns, the magnetic flux generated by the respective windings will be equal and in opposite directions, so that the effect of one will neutralize the effect of the other, with the result that the induction of current in the secondary winding 155 will cease and the warning devices on the caboose will indicate a fault in the electric system. The breakage of the wire 3 also opens the circuit through the warning devices on the locomotive so that these devices will operate to warn the operator that there is a fault in the electric system.

If the wire 4 should break, the operating coil 62 of the relay switch device 31 on the locomotive will be deenergized and the pressure of the spring 71 will cause the plunger 63 to move downwardly carrying the switch 65 with it to its lowermost position in which the circuit through the primary winding 27 of the locomotive transformer is open. With this circuit open, the electric equipment throughout the train will be deenergized and the warning devices on the locomotive and caboose will operate to warn the operator and trainmen of a fault in the electric system.

When any of the wires 2, 3 and 4 are broken the relay switch devices 31 and 150 operate to open the circuits which they control.

If a short circuit between the application wire 2 and the return wire 3 should occur, the primary winding 154 of the caboose transformer will be deenergized and as a result of such deenergization, the warning devices and relay switch devices on the locomotive and caboose will be caused to operate in the same manner as described in connection with the breakage of the wire 2.

In the event of a short circuit between the release wire 4 and the return wire 3, the locomotive relay switch device 31 will operate to open the circuit through the primary winding 27 of the locomotive transformer and cause the deenergization of the electric warning system throughout the train and the warning devices on the locomotive and caboose and the caboose relay switch device 150 will operate in the same manner as described in connection with the breakage of the wire 4.

The warning system hereinbefore described has been so arranged that it may be utilized for signalling between the cab of the locomotive and the caboose and for signalling from any car to the locomotive and caboose, and for initiating such signals, the signal switch devices 30, 30ᵃ and 30ᵇ are provided.

The signal switch device 30 on the locomotive and the switch devices 30ᵃ on the cars are interposed in the circuit through the secondary winding 28 of the locomotive transformer 26 and the primary winding 154 of the caboose transformer 149 and are each normally maintained in circuit closed position, while the signal switch device 30ᵇ on the caboose is interposed in the circuit through the secondary winding 156 of the caboose transformer, the magnet 49 of the magnet valve device 33 on the locomotive and the operating coil 62 of the relay switch device 31 on the locomotive and is normally maintained in circuit closed position.

If the operator wishes to signal to a trainman on the caboose, he first depresses the handle 89 of the locomotive signal switch device 30 to the position shown in Fig. 7 and then releases the handle, whereupon the pressure of the spring 92 causes the handle, plunger stem 85, which is operatively engaged by the latch 88, to move upwardly. As the plunger stem is thus moved, the switch member 91 is raised out of contact with the contact fingers 76 and 77, thus opening the circuit through the secondary winding 28 of the locomotive transformer and the primary winding 154 of the caboose transformer, thus causing the deenergization of the secondary windings 155 and 156 of the caboose transformer and of course deenergizes the circuits in which these secondary windings are included. Now, since the magnet 49 of the caboose magnet valve device 33 is connected in circuit with the secondary winding 155, the magnet will be deenergized and the magnet valve device will operate to establish communication through which fluid under pressure is supplied from the reservoir 58 on the caboose to the caboose whistle 34, causing the whistle to sound. Since the magnet 49 on the locomotive is connected in circuit with the secondary winding 156 of the caboose transformer, this magnet will also be deenergized and the magnet valve device on the locomotive will be caused to operate to establish communication through which fluid under pressure is supplied from the reservoir 58 on the locomotive to the whistle 34 on the locomotive, causing said whistle to sound. The warning devices 151 on the locomotive and caboose will also visibly indicate this signal.

After the switch member 91 has been moved out of contact with the contact fingers 76 and 77, the latch member 88, due to its sliding engagement with the lug 94 on the switch casing, will be caused to move out of lifting engagement with the plunger stem 85, whereupon the pressure of the spring will cause the plunger stem 85, plunger 79 and switch member 91 to move downwardly to its normal position in which the switch member again contacts with the contact fingers 76 and 77 and closes the circuit through the secondary winding 28 of the locomotive transformer and the primary winding 154 of the caboose transformer. With this circuit again closed, the magnets 49 on the locomotive and caboose are energized so that the magnet valve devices operate to close off the flow of fluid from the reservoirs 58 to the whistle 34, thus silencing the whistles. When the magnet valve devices are thus operated, the reservoirs 58 are recharged with fluid under pressure. It will here be noted that the downward movement of the plunger stem and the plunger is relatively slow, the speed thereof being controlled by the rate of discharge of fluid from the chamber 81 through the port 84 in the plunger 79.

The signal switch device 30ᵇ on the caboose is identical in construction with that of the signal switch device 30 on the locomotive and is, as before described, connected in circuit with the magnet 49 of the magnet valve device 33 on the locomotive. When a trainman wishes to reply to the operator's signal or wishes to originate a signal to the operator, he manipulates the caboose switch device 30ᵇ in the same manner as described in connection with the locomotive signal switch device. When the caboose signal switch device is thus operated, the circuit through the magnet 49 of the locomotive magnet valve device 33 is first opened, causing the magnet valve device to operate to supply fluid under pressure to sound the whistle 34 on the locomotive and is then closed, causing the magnet valve device to operate to silence the whistle. The warning device 151 on the locomotive will also visibly indicate the signal initiated by the trainman.

If for any reason a trainman should desire to signal from any car on the train, he operates the signal switch device 30ᵃ carried by the car on which he is stationed. By operating any one of these car signal switch devices the system will function to indicate a signal on the locomotive and caboose in the same manner as described in connection with the signalling by means of the operator's signal switch device.

It will here be noted that the car signal switch devices 30 are interposed in the application wire 2 and that the tuned impedance devices 29 provide for the uninterrupted flow of direct current past any car signal switch device which may be open, so that if an application of the brakes is being made and a trainman manipulates the signal switch device on any car, the brake application will not be affected in any way. These impedance devices also serve to prevent alternating current from by-passing the car switch devices.

When the locomotive signal switch device or any one of the car signal switch devices is operated to cause a signal to be indicated, the operating coils 62 of the relay switch devices 31 and 150 on the locomotive and caboose, respectively, are deenergized and the pressure of their springs 71 cause the stem 63 and switch members carried thereby to move downwardly, but it will be understood that the signal switch devices will operate to close the circuit through these coils before the relay switch devices can operate to open the circuits which they control. When the caboose signal switch device is operated to cause a signal to be indicated, the coil 62 of the relay switch device 31 on the locomotive is momentarily deenergized, but as just described, it will be again energized before it can operate to open the circuit which it controls.

It will be understood from the foregoing description that when the electric system is faulty, the relay switch devices 31 and 150 will operate to open the circuits which they normally maintain closed and that they cannot again be moved to their circuit closing positions until such time as the fault is remedied and the reset switch 32 is moved to its circuit closed position.

In double heading service when two locomotives equipped with the locomotive portion of the electro-pneumatic brake equipment hereinbefore described, are coupled together, the control of the train brakes, either electrically or pneumatically, will be from the head locomotive and the control on the second locomotive will be rendered ineffective. To render the control from the second locomotive ineffective, the handle 9 of the combined double heading cock and switch device 7 is moved from its vertical position as shown in Fig. 1 to a horizontal position, causing the valve 8 to rotate and close off communication from the brake valve device 5 to the brake pipe, thus rendering the brake valve device ineffective to control the brakes. The switch arms 13 and 14 rotate with the valve 8 and when the device 7 is in its double heading position, the contact plate 171 is out of contact with the contact terminals 172 and 173 so that the connection from the generator to the brake switch device 21 is open, thus rendering the brake switch device ineffective to control the brakes. The contact plates 15 and 16 are also out of contact with their respective contact terminals, so that the alternating current transmission system to the train wires is deenergized.

In Fig. 8 of the drawings, I have illustrated the manner of connecting an incandescent lamp in the warning circuits. This lamp may be substituted for the electrically controlled fluid pressure operated warning equipment shown in Figs. 1 and 3 or may be used in combination with this warning equipment in lieu of the warning devices 151.

From the foregoing description it will be seen that I have provided a normally closed circuit warning system which comprises two normally closed warning circuits that are energized by current in a normally closed current transmission circuit which includes the generator 24, the locomotive transformer 26 and the primary winding 154 of the caboose transformer 149. It will also be seen that I have so combined this warning system with the normally open brake controlling circuit system that the condition of the brake controlling circuit system is indicated at all times either visibly or audibly or both visibly and audibly.

In the foregoing description the sources of electric current have been described as power driven generators but it will be understood that any other suitable source of current may be employed.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In an electric brake system, the combination with means operating on a normally open circuit for controlling the brakes, of means operative to selectively close or open said circuit to effect the operation of said means to control the brakes, means operating on a normally closed circuit and unaffected by the closing and opening of the normally open circuit by the second mentioned means for indicating the condition of said normally open circuit, and means included in said normally closed circuit operative without interfering with the integrity of the normally open circuit to control the operation of the indicating means to indicate a signal.

2. In an electric brake system, the combination with means operating on a normally open circuit for controlling the brakes, of means operative to selectively close or open said circuit to effect the operation of said means to control the brakes, means operating on a normally closed circuit and unaffected by the closing and opening of the normally open circuit by the second mentioned means for indicating the condition of said normally open circuit, and switch means included in said normally closed circuit and operable manually without interference with the normally open circuit for controlling the operation of the indicating means to indicate a signal.

3. In an electric brake system, the combination with means operating on a normally open circuit for controlling the brakes, of means operative to selectively close or open said circuit to effect the operation of said means to control the brakes, means operating on a normally closed circuit and unaffected by the closing and opening of the normally open circuit by the second mentioned means for indicating the condition of said normally open circuit, and means operable manually without interference with the normally open circuit for opening and closing said normally closed circuit for controlling the operation of the indicating means to indicate a signal.

4. In an electric brake system, the combination with means operating on a normally open circuit for controlling the brakes, of a normally closed circuit, a source of current in said normally closed circuit, means in said normally closed circuit operable automatically upon damage to either of said circuits for opening the circuit through said source of current, and means operable upon the opening of said normally closed circuit for warning of said damage, the first mentioned means being operable to open the circuit through said source of current only when the current has been interrupted for a predetermined period of time.

5. In an electric brake system, the combination with means operating on a normally open circuit for controlling the brakes, of a normally closed warning circuit, a source of current in said normally closed circuit, switch means included in said normally closed circuit operable automatically upon damage to either of said circuits for opening the circuit through said source of current, means operable upon opening said normally closed circuit for warning of said damage, a signal switch device operable to open and close said normally closed circuit to control the operation of the warning means to indicate a signal, and means operable to prevent said switch-means from operating to open the normally closed circuit when said signal switch device is operated to open and close the circuit.

6. In an electric brake system, the combination with means operating on a normally open circuit for controlling the brakes, of a normally closed warning circuit, a source of current in said normally closed circuit, slow acting switch means included in said normally closed circuit operable automatically upon damage to either of said circuits for opening the circuit through said source of current, means operable upon the opening of said normally closed circuit for warning of said damage, and a signal switch device operable to open and close said normally closed circuit to effect the operation of the warning means to indicate a signal, said signal switch device being operable to open and close said normally closed circuit before said slow acting switch means operates to open the circuit.

7. The combination with electrically controlled devices on the cars and caboose of a train adapted upon energization to effect an application of the brakes, and three main train wires connected to said devices, of a source of direct current on the head end of the train normally cut off from two of said train wires and connected to the other of said train wires, a switch device operative to close the circuit through all of said wires, devices and source of current, to effect the energization of said devices, a normally closed circuit including all of said train wires, a source of alternating current for said normally closed circuit, and means on the head end of said train and included in said normally closed circuit for indicating the integrity of the circuit through said train wires and electrically controlled devices.

8. The combination with electrically controlled devices on the cars and caboose of a train adapted upon energization to effect an application of the brakes, and three main train wires connected to said devices, of a source of direct current on the head end of the train normally cut off from two of said train wires and connected to the other of said train wires, a switch device operative to close the circuit through all of said wires, devices and source of current to effect the energization of said devices, a normally closed circuit including all of said train wires, a source of alternating current for said normally closed circuit, means on the head end of the train and included in said normally closed circuit for indicating the integrity of the circuit through said train wires and electrically controlled devices, and means on the caboose and included in said normally closed circuit for also indicating the integrity of the circuit through said train wires and electrical devices.

9. The combination with electrically controlled devices on the cars and caboose of a train adapted upon energization to effect an application of the brakes, and three main train wires connected to said devices, of a source of direct current on the head end of the train normally cut out of circuit with said train wires, a switch device operable to close the circuit through the train wires, source of current and devices to effect the energization of said devices, a normally closed circuit including said main train wires, a source of alternating current for said normally closed circuit, means included in said normally closed circuit for indicating visibly the integrity of the first mentioned circuit through said train wires and electrically controlled devices, and means also included in said normally closed circuit for indicating audibly when the current is interrupted in any of said train wires.

10. The combination with electrically controlled devices on the cars and caboose of a train adapted upon energization to effect an application of the brakes, and three main train wires connected to said devices, of a source of direct current on the head end of the train normally cut out of circuit with said train wires, a switch device operable to close the circuit through the train wires, source of current and devices to effect the energization of said devices, a normally closed circuit including said main train wires, a source of alternating current for said normally closed circuit, means included in said normally closed circuit for indicating visibly the integrity of the first mentioned circuit through said train wires and electrically controlled devices, means also included in said normally closed circuit for indicating audibly when the current is interrupted in any of said train wires, means for preventing the flow of direct current to said source of alternating current, and means for closing off alternating current from said source of direct current.

11. In an electric brake system, the combination with means operating on a normally open circuit for controlling the brakes, of a normally closed circuit system for indicating the condition of said normally open circuit and including a current transmission circuit and two warning circuits inductively energized by current in said transmission circuit, and warning means included in each of said warning circuits for indicating the condition of said normally open circuit.

12. The combination with electrically controlled devices on a train adapted upon energization to effect an application of the brakes, and main train wires connected to said devices, a source of direct current normally cut out of circuit with said train wires, a switch device on the head end of the train operable to close the circuit through said source of current, train wires and devices to effect the energization of said devices, a normally closed circuit warning system including a source of alternating current and said train wires and comprising a plurality of normally closed warning circuits and a normally closed current transmission circuit for normally inducing a current in each of said warning circuits, and means included in each of said warning circuits for indicating the integrity of the first mentioned circuit through said train wires and electrically controlled devices.

13. The combination with electrically controlled devices on a train adapted upon energization to effect an application of the brakes, and main train wires connected to said devices, of a source of direct current normally cut out of circuit with said train wires and devices, a switch device on the head end of the train operable to close the circuit through said source of current, train wires and devices to effect the energization of said devices, a normally closed circuit warning system including a source of alternating current and said train wires and comprising a plurality of normally closed warning circuits and a normally closed current transmission circuit for normally inducing a current in each of said warning circuits, an electric relay switch device normally energized and maintaining said transmission circuit closed and operative at a predetermined time after deenergization to open said circuit to said train wires, said relay switch device being deenergized upon the breakage of any of said train wires and the consequent opening of the circuit through said electrically controlled devices, and means included in each of said warning circuits to cause a warning to be indicated upon the opening of said transmission circuit by said relay switch device.

14. In an electric brake system, the combination with means operating on a normally open circuit for controlling the brakes, of a normally closed circuit system for indicating the condition of said normally open circuit and including a current transmission circuit and two warning circuits inductively energized by current in said transmission circuit, warning means included in each of said warning circuits for indicating the condition of said normally open circuit, and a signal switch device in the normally closed circuit and operative to open and close said transmission circuit for momentarily deenergizing said warning circuits to cause said warning means to operate to indicate a signal.

15. In an electric brake system for trains, the combination with means operating on a normally open circuit system for controlling the brakes, of a plurality of main train wires included in said normally open circuit, a normally closed circuit system for indicating the condition of the normally open circuit, said normally closed circuit system also including said train wires and comprising a current transmission circuit and two warning circuits inductively energized by current in said transmission circuit, warning means included in said warning circuits operative upon the deenergization of said warning circuits to cause said warning means to indicate a warning, and electric relay switch devices operative at a predetermined time after the interruption of the current flowing through said normally closed circuit for deenergizing said closed circuit system.

16. The combination with electrically controlled devices on a train adapted upon energization to effect an application of the brakes, and main train wires connected to said devices, of a source of direct current normally cut out of circuit with said train wires and devices, a switch device on the head end of the train operable to close the circuit through said source of current, train wires and devices, a normally closed circuit warning system for indicating the condition of said train wires, said warning system including a source of alternating current and said train wires and comprising a plurality of normally closed warning circuits and a normally closed current transmission circuit normally energizing the warning circuits, and means operable at a predetermined time after the deenergization of any of said normally closed circuits for deenergizing the other of said normally closed circuits, and means included in said warning circuits operative upon the deenergization of the warning circuits to indicate that said circuits are deenergized.

17. In an electro-pneumatic brake equipment for a train, the combination with a brake pipe, a brake valve device at the head end of the train for varying the pressure of fluid in the brake pipe and valve means subject to the variations in the pressure of fluid in the brake pipe for controlling the brakes, of electrically controlled devices operating on a normally open circuit system for controlling the brakes, a switch device on the head end of the train for controlling the closing and opening of said circuit system to control the brakes, a normally closed warning circuit system combined with said normally open circuit system and including means for indicating at the head end of the train the condition of said normally open circuit system, and a combined valve and switch device operable to render said brake valve device and brake switch device either effective or ineffective to control the brakes and to render the indicating means at the head end of the train effective or ineffective to indicate the condition of the normally open circuit system.

18. In an electro-pneumatic brake equipment, the combination with a normally charged reservoir and a brake cylinder, of electrically controlled valve means operative to control the supply of fluid under pressure from said reservoir to said brake cylinder to effect an application of the brakes and operative to control the release of fluid under pressure from the brake cylinder to the atmosphere to effect the release of the brakes, said electrically controlled valve means comprising a release valve normally establishing communication through which said brake cylinder is connected to the atmosphere and also comprising an application valve normally subject on one side to fluid under pressure for closing communication from said reservoir to the brake cylinder, a magnet valve device operable upon energization to supply fluid under pressure to operate said release valve to close communication from the brake cylinder to the atmosphere and another magnet valve device operable upon energization to release fluid under pressure from said side of said application valve to permit said valve to operate to establish communication through which fluid under pressure flows from said reservoir to said brake cylinder to effect an application of the brakes.

19. In an electro-pneumatic brake equipment, the combination with a brake cylinder, of pneumatically controlled means for supplying fluid under pressure to and releasing fluid under pressure from said brake cylinder, electrically controlled means for supplying fluid under pressure to and releasing fluid under pressure from the brake cylinder, a valve included in said pneumatically controlled means and a valve included in said electrically controlled means establishing communication through which the brake cylinder is connected to the atmosphere, the first mentioned valve being operative to close said communication when the pneumatically controlled means is operated to supply fluid under pressure to the brake cylinder and the second mentioned valve being operative by fluid under pressure to close said communication when the electrically controlled means is operated to supply fluid under pressure to the brake cylinder, and a magnet valve device included in said electrically controlled means operative upon energization to supply fluid under pressure to the second mentioned valve and operative upon deenergization to release fluid under pressure from said valve.

20. In an electro-pneumatic brake equipment, the combination with a brake cylinder and a reservoir normally charged with fluid under pressure, of a flexible application valve normally subject to fluid under pressure from said reservoir for closing communication from said reservoir to said brake cylinder, a flexible release valve normally establishing communication through which the brake cylinder is connected to the atmosphere, a normally deenergized magnet valve device operative upon energization to supply fluid under pressure from said reservoir to cause said release valve device to operate to close communication from the brake cylinder to the atmosphere, and a normally deenergized magnet valve device operative upon energization to release fluid under pressure from said application valve to permit fluid under pressure from said reservoir to unseat said application valve to establish communication through which fluid under pressure flows from said reservoir to the brake cylinder to effect an application of the brakes.

21. The combination with two sets of electrically controlled devices on a train adapted upon energization to effect an application of the brakes, of a brake application train wire connected to one set of said devices, a release train wire connected to the other set of devices, a return wire connected to both sets of devices, a brake controlling source of current normally cut out of circuit with said train wires and devices, a brake switch on the head end of the train operable to connect said source of current in circuit with said wires and both of said sets of devices to effect the energization of said devices, a normally energized warning circuit system indicating the condition of said train wires and including electrically controlled warning means at the head end of the train, electrically controlled warning means at the rear of the train, a source of current for energizing the warning circuit system, a transformer on the rear end of the train having a primary winding connected in circuit with the last mentioned source of current through said application train wire and return train wire, and having two secondary windings, one of which is connected in circuit with the electrically controlled warning means at the head end of the train through said release train wire and said return train wire, and the other of said secondary windings being connected in circuit with the electrically controlled warning means on the rear end of the train, both of said secondary windings and the circuits in which they are included being deenergized upon the deenergization of said primary winding by the interruption of the current through either the application train wire or the release train wire, the first mentioned secondary winding being adapted, upon the interruption in the current in said return wire to render said primary winding ineffective to maintain the second mentioned secondary winding and its circuit energized, means operative to indicate a warning upon the deenergization of the second mentioned secondary winding, an electric relay switch device operative at a predetermined time after the deenergization of the first mentioned secondary winding to open the circuit through the second mentioned secondary winding, means operative to indicate a warning upon the opening of the circuit through the second mentioned secondary winding, and another electric relay switch device operative at a predetermined time after the opening of the circuit through the second mentioned secondary winding to deenergize said primary winding.

22. The combination with electrically controlled devices on a train adapted upon energization to effect an application of the brakes, and main train wires connected to said devices, of a source of direct current normally cut out of circuit with said train wires and devices, a switch device on the head end of the train operable to close the circuit through said source of current, train wires and devices, a normally closed circuit warning system for indicating the condition of said train wires, said warning system including a source of alternating current and said train wires and comprising a plurality of normally closed warning circuits and a normally closed current transmission circuit, a transformer having a primary winding included in said current transmission circuit and two secondary windings energized by current in said primary winding, each one of said secondary windings being included in one of said warning circuits, a relay switch device operable to deenergize the warning circuit system at a predetermined time after the interruption of current in any of said normally closed circuits, and means included in said warning circuits operative upon the deenergization of the warning circuits to indicate that the warning circuits are deenergized.

23. The combination with electrically controlled devices on a train adapted upon energization to effect an application of the brakes, and main train wires connected to said devices, of a source of direct current normally cut out of circuit with said train wires and devices, a switch device on the head end of the train operable to close the circuit through said source of current, train wires and devices, a normally closed circuit warning system for indicating the condition of said train wires, said warning system including a source of alternating current and said train wires and comprising a plurality of normally closed warning circuits and a normally closed current transmission circuit, a transformer having a primary winding included in said current transmission circuit and two secondary windings energized by current in said primary winding, each one of said secondary windings being included in one of said warning circuits, a relay switch device operative at a predetermined time after an interruption in the current in any way of said normally closed circuits to deenergize said warning circuit system, means included in said warning circuit system operative upon deenergization of the system to indicate that the system is deenergized, signal switch devices included in said warning circuit system each operative to momentarily deenergize the warning circuits to cause the warning means to operate to indicate a signal, each of said switch devices being timed to open and close the circuit in which it is interposed before said relay switch device has operated to deenergize the warning circuit system.

24. In an electric brake system for a train of vehicles, the combination with an electric brake controlling circuit system including two electric circuits extending from vehicle to vehicle and comprising two line conductors and a common path, indicating means controlled by both circuits to indicate the integrity of said circuits, two normally deenergized brake controlling devices on each vehicle operative upon energization to effect an application of the brakes, one of said brake controlling devices being connected between one of said line conductors and the common path and the other being connected between the other line conductor and the common path, means to normally supply current to said circuits to energize the indicating means, and means to supply current to said circuits to energize said brake controlling devices.

25. In an electric brake system for a train of vehicles, the combination with an electric brake controlling circuit system including two electric circuits, each extending between the head vehicle of the train and the rear vehicle of the train, means located at the head vehicle to supply current to one of said circuits, means located at the rear vehicle to be energized by current flow in the first mentioned circuit and to thereby produce a current flow in the other circuit, and indicating means located at the head vehicle of the train to be energized by current flow in said other circuit.

26. In an electric brake system for a train of vehicles, the combination with an electric brake controlling circuit system including two electric circuits, each extending from vehicle to vehicle, means located in one vehicle to supply current to one of said circuits, means located in another car to be energized by current flow in the first mentioned circuit and to thereby produce a current flow in the other circuit, and indicating means located in the first mentioned vehicle to be energized by current flow in said other circuit.

27. In an electro-pneumatic brake system involving three conductors 2, 3 and 4 extending from a control station to a remote station, the combination therewith of a first transformer 26 the secondary of which is connected with conductors 2 and 3 at the control station, a second transformer 149 the primary of which is connected with conductors 2 and 3 at the remote station, a relay 150 having its winding 62 connected with a first secondary on transformer 149, a second secondary on said transformer 149 connected with conductors 3 and 4 through a front contact of relay 150 and so related to the other windings on transformer 149 that if current flows through the primary and the second secondary in series the voltage induced thereby in the first secondary will be equal and opposite, a relay 31 at said control station having its winding 62 connected across conductors 3 and 4, a circuit for the primary of transformer 26 including a front contact of relay 31 and a source of alternating current, a normally open manually operable contact included in said circuit and connected in multiple with said contact of relay 31, indicating devices connected in multiple with said relays, a normally open brake controlling circuit including the conductors 2, 3 and 4, a source of current for said normally open circuit, electrically controlled valve means included in said normally open circuit operable to supply fluid under pressure to effect an application of the brakes and to release fluid under pressure to effect a release of the brakes, and means operable to cut said source of current into and out of circuit with said valve means to control the brakes.

28. In an electro-pneumatic train brake system involving three conductors 2, 3 and 4 extending from one station to another on the train, the combination therewith of a first transformer 26 located at one station and supplying current to conductors 2 and 3, a second transformer 149 located at the other station and receiving current from conductors 2 and 3 and provided with two secondary windings, a relay 150 having its winding receiving energy from the first secondary winding of transformer 149, the second secondary winding of transformer 149 being connected across conductors 3 and 4 through a contact of said relay and being so related to the other windings of the second transformer that in the event of a difference of potential across conductors 2 and 4 the voltages created in the first secondary winding due to current in the primary and the second secondary winding are equal and opposite, a second relay 31 at the first station having its winding receiving energy from conductors 3 and 4, means controlled by relay 31 for supplying current to the primary of said first transformer 26, indicating devices connected in multiple with said relays, a normally open brake controlling circuit including the conductors 2, 3 and 4, a source of current for said normally open circuit, electrically controlled valve means included in said normally open circuit operable to supply fluid under pressure to effect an application of the brakes and to release fluid under pressure to effect a release of the brakes, and means operable to cut said source of current into and out of circuit with said valve means to control the brakes.

29. In an electro-pneumatic train brake system involving three conductors 2, 3 and 4 extending from one station to another on the train, the combination therewith of a relay at the first station connected across conductors 3 and 4, means located at the first station and controlled by said relay for creating a difference of potential across conductors 2 and 3, a second relay located at the second station and receiving energy from said conductors 2 and 3, means at said second station for creating a difference of potential across conductors 3 and 4 if and only if said second relay is energized, a normally open brake controlling circuit including the conductors 2, 3 and 4, a source of current for said normally open circuit, electrically controlled valve means included in said normally open circuit operable to supply fluid under pressure to effect an application of the brakes and to release fluid under pressure to effect a release of the brakes, and means operable to cut said source of current into and out of circuit with said valve means to control the brakes.

30. In an electro-pneumatic train brake system involving three conductors 2, 3 and 4 extending from one station to another on the train, the combination therewith of means for creating a difference of potential across conductors 2 and 3 at one station, means at the other station for creating a difference of potential across conductors 3 and 4 if and only if a difference of potential exists across conductors 2 and 3, means located at the first station for preventing a difference of potential across conductors 2 and 3 unless a difference of potential exists across conductors 3 and 4, an indicating device at the said second station responsive to the difference of potential across conductors 2 and 3, an indicating device at the said first station responsive to the difference of potential across conductors 3 and 4, a normally open brake controlling circuit including the conductors 2, 3 and 4, a source of current for said normally open circuit, electrically controlled valve means included in said normally open circuit operable to supply fluid under pressure to effect an application of the brakes and to release fluid under pressure to effect a release of the brakes, and means operable to cut said source of current into and out of circuit with said valve means to control the brakes.

31. In an electric train brake system involving three conductors 2, 3 and 4 extending from one station to another on the train, the combination therewith of means for creating a difference of potential across conductors 2 and 3 at one station, means at the other station for creating a difference of potential across conductors 3 and 4 if and only if a difference of potential exists across conductors 2 and 3, an indicating device at the second station responsive to the difference of potential across conductors 2 and 3, and an indicating device at the first station responsive to the difference of potential across conductors 3 and 4.

32. In an electric brake equipment including a circuit system comprising a first and a second circuit, said two circuits composed of a path common to both circuits and of two conductors, a transformer between the two circuits the primary of which is in the first circuit and the secondary of which is in the second circuit, said primary and secondary being not only in an inductive relation but also connected in series with their windings opposed to each other, means to supply current to the first circuit to energize the primary of the transformer, a third circuit, a secondary in said third circuit the winding of which is in such inductive relation to the primary and first mentioned secondary as to be energized when current is flowing in the primary but not when current is flowing through both the primary and the first mentioned secondary in series, and a circuit breaker in the second circuit held in its closed position as long as the secondary of the third circuit is energized and for a predetermined period of time after the third circuit is de-energized.

33. In a brake system including an electric circuit, means to supply current to said circuit, a brake controlling circuit the integrity of which depends upon the integrity of the first mentioned circuit, a signal device normally indicating the integrity of both of said circuits and being operative to indicate a signal, means for controlling the first mentioned circuit to cause the signal device to function to indicate a signal, means operative automatically to cut off the supply of current to the first mentioned circuit after the failure in the integrity of either of said circuits, and means for preventing the last mentioned means from operating to cut off the supply of current to the first mentioned circuit when the second mentioned means is operated to effect a signal.

34. In a brake system including an electric circuit, means to supply current to said circuit, a brake controlling circuit the integrity of which depends upon the integrity of the first mentioned circuit, a signal device normally indicating the integrity of both of said circuits and being operative to indicate a signal, means for controlling the first mentioned circuit to cause the signal device to function to indicate a signal, means operative automatically to cut off the supply of current to the first mentioned circuit after the failure in the integrity of either of said circuits, and means for delaying the operation of the current cut-off means for a longer period of time than is required to effect a signal through the medium of the second mentioned means.

35. In a brake system including an electric circuit, means to supply current to said circuit, a brake controlling circuit the integrity of which depends upon the integrity of the first mentioned circuit, a signal device normally indicating the integrity of both of said circuits and being operative to indicate a signal, means for controlling the first mentioned circuit to cause the signal device to function to indicate a signal, said means being conditioned manually to operate automatically to control the first mentioned circuit, means operative automatically to cut off the supply of current to the first mentioned circuit after a failure in the integrity of either of said circuits, and means for delaying the operation of the current cut-off means for a longer period of time than is required for the automatic operation of the second mentioned means to effect a signal.

36. In a brake system including an electric circuit, means to supply current to said circuit, a brake controlling circuit the integrity of which depends upon the integrity of the first mentioned circuit, a signal device normally indicating the integrity of both of said circuits and being operative to indicate a signal, means for controlling the first mentioned circuit to cause the signal device to function to indicate a signal, said means being conditioned manually to operate automatically to control the first mentioned circuit, means operative automatically to cut off the supply of current to the first mentioned circuit after a failure in the integrity of either of said circuits, and means for preventing the operation of the cut-off means when the second mentioned means operates to effect a signal.

37. In an electric brake controlling system, the combination with means included in a normally open circuit for controlling the brakes, of means operative to open and close said circuit for controlling the operation of said means, a normally closed circuit, a source of current in said normally closed circuit, means in said normally closed circuit operable automatically after a failure in the integrity of the normally closed circuit for opening the circuit through said source of current, means operable upon the opening of the normally closed circuit for warning of said failure, a switch device operable to open and close the normally closed circuit for signalling, and means for preventing the third mentioned means from operating to open the circuit through said source of current upon the operation of said switch means.

38. In an electric brake system including two circuits, a power source to supply current to one of said circuits, means to supply current from said circuit to the other of said circuits, a brake controlling circuit, means included in said brake controlling circuit for controlling the brakes, means operative to open and close the brake controlling circuit for controlling the operation of said means, switch means automatically operative after a failure in the integrity of at least any one of said circuits, to cut off the supply of current to the first mentioned circuit, normally energized means operable upon the opening of the first mentioned circuit for warning of said failure, means operable to open and close the first mentioned circuit for causing a signal to be effected, and means for rendering the switch means ineffective to cut off the supply of current from the first mentioned circuit while the last mentioned is functioning to effect a signal.

39. In an electric brake system for a train including two warning circuits and a brake controlling circuit extending between two stations on the train, a power source located at one station to supply current to one of said warning circuits, means located at the other station to supply current from said warning circuit to the other warning circuit, switch means located at the first station automatically operative after a failure in the integrity of any of said circuits to cut off the supply of current to the first mentioned warning circuit, means operable upon the cutting off of the supply of current to the first mentioned circuit for warning of said failure, a signal switch device operable to open and close one of the warning circuits to operate the warning means to indicate a signal, and means rendering the switch means ineffective to cut off the supply of current to the first mentioned warning circuit while the signal switch device is operating to effect a signal.

CLYDE C. FARMER.